United States Patent
Fedurco et al.

(10) Patent No.: US 10,150,833 B2
(45) Date of Patent: Dec. 11, 2018

(54) POLYMER WITH URETHANE OR THIOURETHANE UNITS FOR USE, IN PARTICULAR, AS AN ADHESION PRIMER FOR BONDING METAL TO RUBBER

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Milan Fedurco, Clermont-Ferrand (FR); Marco Ribezzo, Clermont-Ferrand (FR); Antonio Delfino, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 154 days.

(21) Appl. No.: 14/786,830

(22) PCT Filed: Apr. 18, 2014

(86) PCT No.: PCT/EP2014/057998
§ 371 (c)(1),
(2) Date: Oct. 23, 2015

(87) PCT Pub. No.: WO2014/173838
PCT Pub. Date: Oct. 30, 2014

(65) Prior Publication Data
US 2016/0122460 A1    May 5, 2016

(30) Foreign Application Priority Data
Apr. 26, 2013  (FR) ...................... 13 53813

(51) Int. Cl.
*C08G 18/38* (2006.01)
*C08G 18/76* (2006.01)
(Continued)

(52) U.S. Cl.
CPC ....... *C08G 18/3868* (2013.01); *C08G 18/348* (2013.01); *C08G 18/3876* (2013.01);
(Continued)

(58) Field of Classification Search
CPC .............. C08G 18/348; C08G 18/3868; C08G 18/3876; C08G 18/677; C08G 18/767;
(Continued)

(56) References Cited

U.S. PATENT DOCUMENTS 2,846,416 A      8/1958  Arnold et al. ............... 260/77.5
4,305,996 A  *  12/1981  Schenk ................. C08G 18/10
                                                                    428/419
(Continued)

FOREIGN PATENT DOCUMENTS

FR    1 322 416 A    3/1963
FR    2 872 820 A1   1/2006

OTHER PUBLICATIONS

International Search Report dated Sep. 1, 2014, issued by EPO in connection with International Application No. PCT/EP2014/057998.

*Primary Examiner* — Thao T Tran
(74) *Attorney, Agent, or Firm* — Fitzpatrick, Cella, Harper & Scinto

(57) ABSTRACT

A polymer has urethane or thiourethane units, which can be used, in particular, as an adhesion primer for the adhesive bonding of metal or glass to rubber. The polymer comprises base units comprising at least a sub-unit of formula $X_1CO$—$NH$—, in which $X_1$ respectively represents O or S, and additional units comprising at least a secondary alcohol (Continued)

(III-1)

(III-2)

(III-3)

function and a thioether function in the α position relative to the alcohol function. The polymer can be used as an adhesion primer for the adhesive bonding of a substrate, for example glass or metal, to an unsaturated rubber, or as a corrosion-resistant protective coating for a metal substrate. A metal reinforcer, such as wire, cord, film or plate, can be coated with the polymer.

10 Claims, 9 Drawing Sheets

(51) Int. Cl.
```
C09D 175/04    (2006.01)
C09D 175/14    (2006.01)
C09D 5/08      (2006.01)
C08G 18/67     (2006.01)
C08G 18/80     (2006.01)
C08G 18/34     (2006.01)
C09J 175/04    (2006.01)
C09J 175/14    (2006.01)
```
(52) U.S. Cl.
CPC ....... *C08G 18/677* (2013.01); *C08G 18/7671* (2013.01); *C08G 18/7685* (2013.01); *C08G 18/8074* (2013.01); *C09D 5/08* (2013.01); *C09D 175/04* (2013.01); *C09D 175/14* (2013.01); *C09J 175/04* (2013.01); *C09J 175/14* (2013.01)

(58) Field of Classification Search
CPC ............ C08G 18/7685; C08G 18/8074; C09D 175/04; C09D 175/14; C09J 175/04; C09J 175/14
See application file for complete search history.

(56) References Cited

U.S. PATENT DOCUMENTS

| | | | |
|---|---|---|---|
| 5,908,700 A * | 6/1999 | Shimizu | C08G 18/12 428/423.1 |
| 8,889,817 B2 | 11/2014 | Fedurco et al. | 528/172 |
| 9,035,013 B2 | 5/2015 | Fedurco | 528/172 |
| 9,120,725 B2 | 9/2015 | Fedurco | 521/27 |
| 9,126,907 B2 | 9/2015 | Fedurco | 521/27 |
| 2004/0162407 A1* | 8/2004 | Okamoto | C08F 4/00 526/314 |
| 2007/0203318 A1* | 8/2007 | Kuma | C08G 18/3876 528/44 |
| 2007/0241313 A1* | 10/2007 | Kato | G02B 3/00 252/585 |
| 2008/0029215 A1 | 2/2008 | Delfino et al. | 156/327 |
| 2009/0012258 A1 | 1/2009 | Shimoma et al. | 528/53 |
| 2009/0162679 A1* | 6/2009 | Asami | C08G 18/0823 428/461 |
| 2010/0047493 A1* | 2/2010 | Dotson | C08G 18/10 428/35.8 |
| 2011/0214810 A1* | 9/2011 | Burckhardt | C07C 251/08 156/331.1 |
| 2011/0319580 A1* | 12/2011 | Aerykssen | C07C 323/52 526/218.1 |
| 2012/0288632 A1* | 11/2012 | Neu | C08G 18/2027 427/379 |
| 2013/0000841 A1 | 1/2013 | Delfino et al. | 156/307.3 |
| 2014/0364552 A1* | 12/2014 | Katakami | C08G 18/00 524/386 |
| 2015/0151592 A1 | 6/2015 | Parfondry et al. | B60C 19/002 |
| 2015/0259463 A1 | 9/2015 | Fedurco et al. | C08G 18/7657 |
| 2015/0274878 A1 | 10/2015 | Fedurco et al. | C08G 18/3243 |

* cited by examiner

Fig. 1
(I-1)
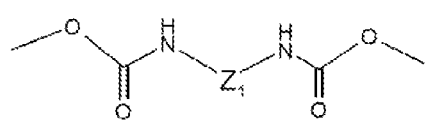
(I-2)
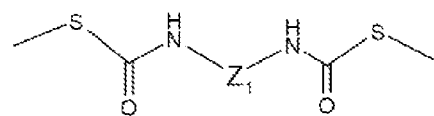
(I-3)
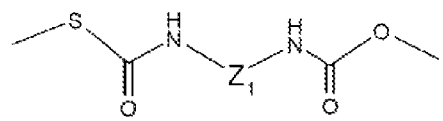
(I-4)
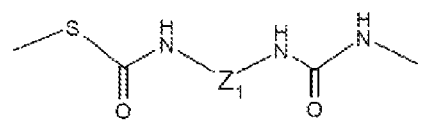
(I-5)
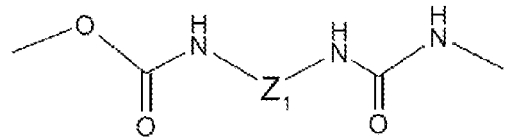
Fig. 2
(II-1)
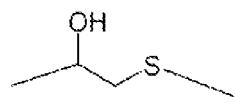
(II-2)
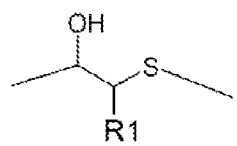
(II-3)
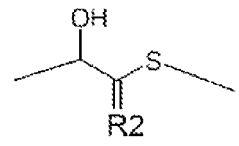

Fig. 3
(III-1)
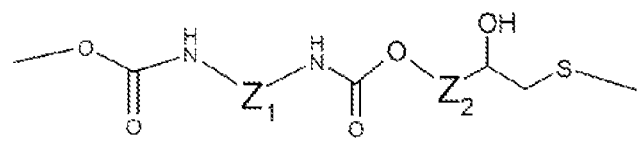
(III-2)
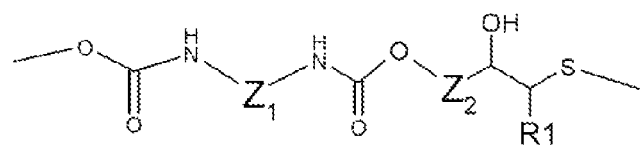
(III-3)
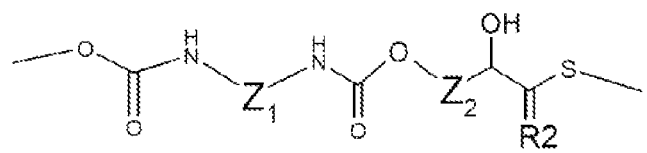

Fig. 4.1
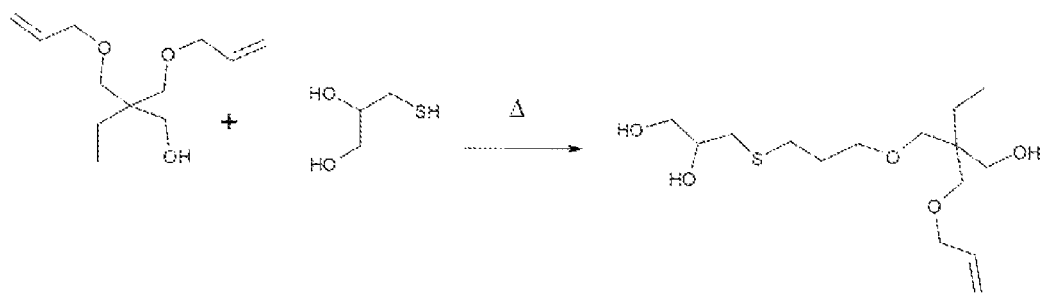
Compound 1    Compound 2    Monomer A1
Fig. 4.2
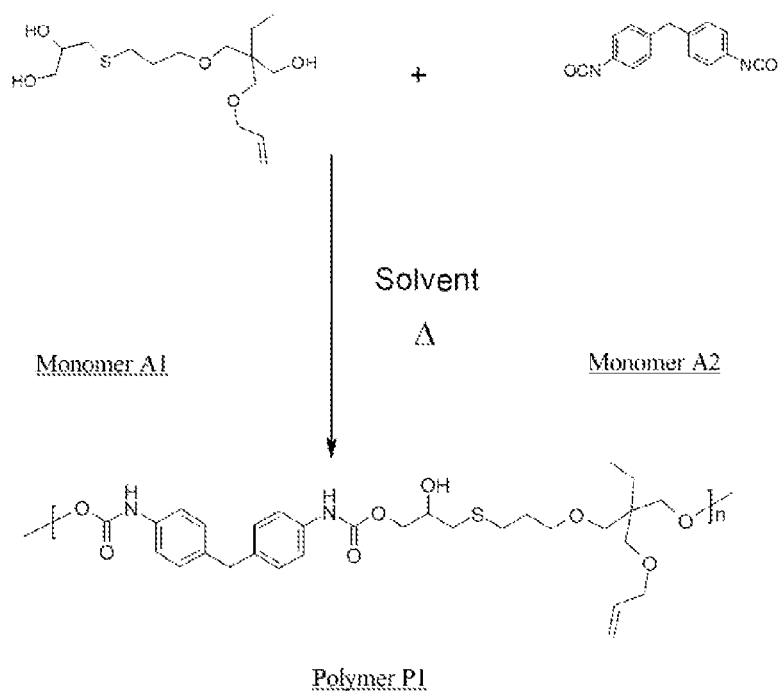
Polymer P1

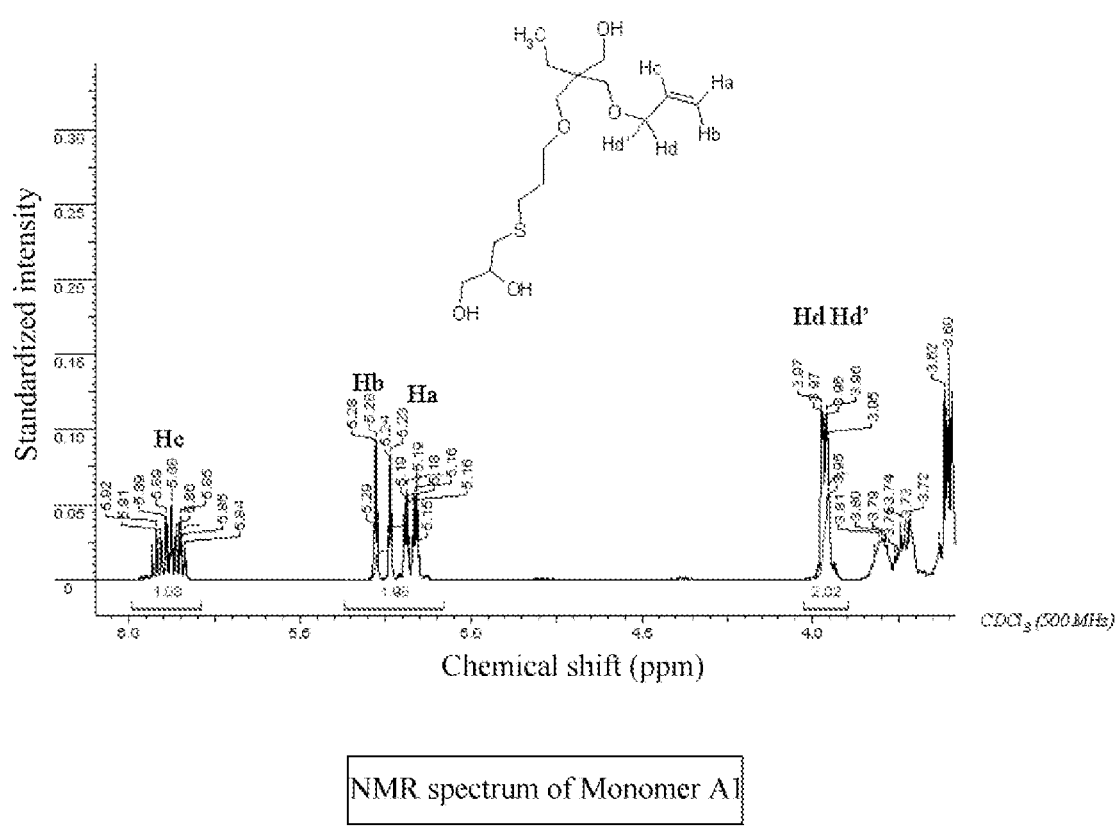
Fig. 5.1
NMR spectrum of Monomer A1

Fig. 5.2
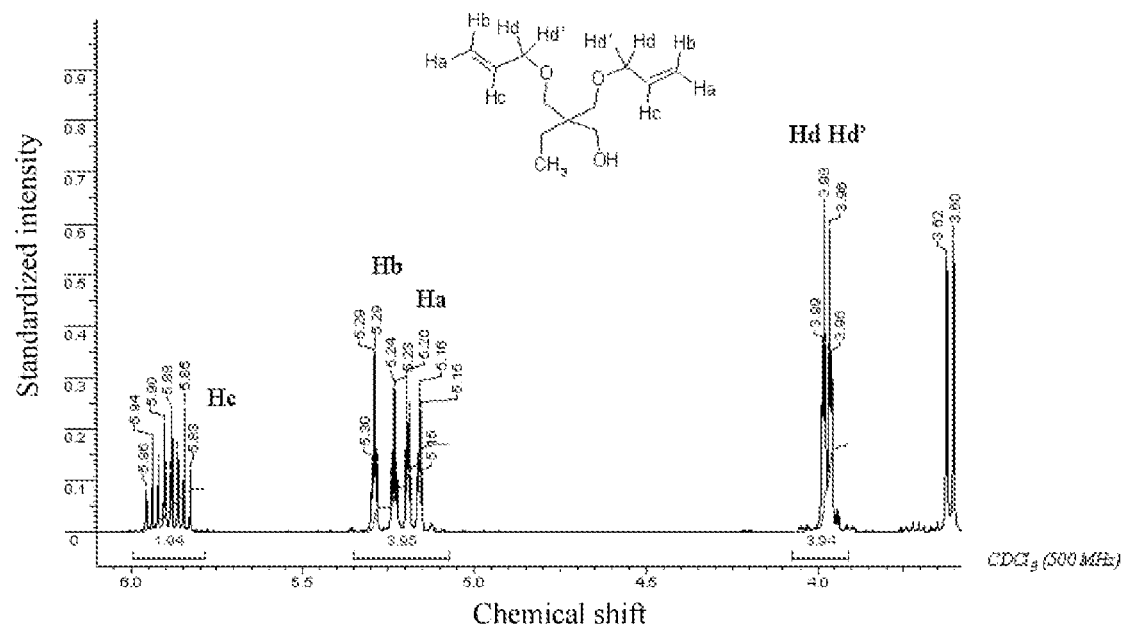
NMR spectrum of Compound 1

Monomer A1    Monomer A3

Solvent
Δ

Polymer P1

Fig. 7.1
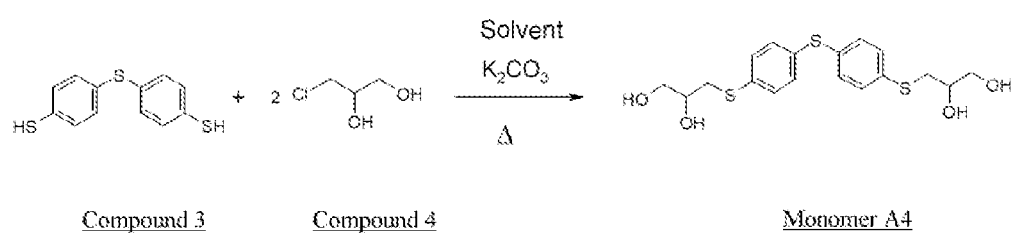
Compound 3    Compound 4    Monomer A4
Fig. 7.2
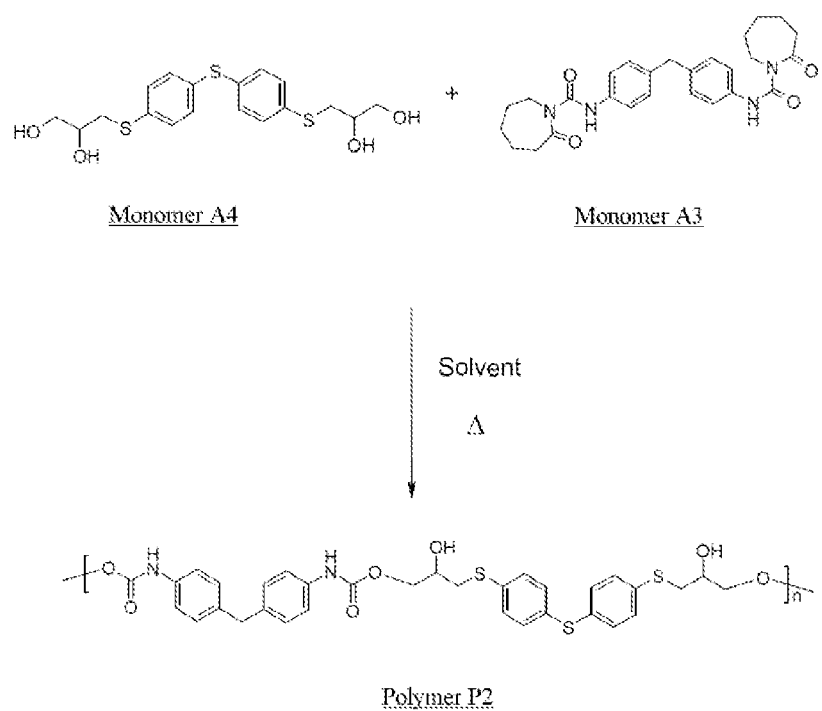
Polymer P2

POLYMER WITH URETHANE OR THIOURETHANE UNITS FOR USE, IN PARTICULAR, AS AN ADHESION PRIMER FOR BONDING METAL TO RUBBER

1. FIELD OF THE INVENTION

The present invention relates to such polymers comprising urethane or thiourethane units, which can be used in particular in adhesive systems intended in particular for the adhesive bonding of metal or glass to rubber.

It more particularly relates to such polymers which can be used as adhesion primers in metal/rubber composites intended for the manufacture of articles made of rubber, such as tyres.

2. PRIOR ART

Metal/rubber composites, in particular for tyres, are well known. They are generally composed of a matrix made of unsaturated rubber, generally diene rubber, which can be crosslinked with sulphur, comprising metal reinforcing elements (or "reinforcers") such as wires, films or cords made of carbon steel.

As they are subjected to very high stresses during the rolling of the tyres, in particular to repeated actions of compression, bending or variation in curvature, these composites must, in a known way, satisfy a large number of sometimes contradictory technical criteria, such as uniformity, flexibility, flexural strength and compressive strength, tensile strength, wear resistance and corrosion resistance, and must maintain this performance at a very high level for as long as possible.

It is easily understood that the adhesive interphase between rubber and reinforcers plays a dominating role in the endurance of this performance. The conventional process for connecting the rubber compositions to carbon steel consists in coating the surface of the steel with brass (copper/zinc alloy), the bonding between the steel and the rubber matrix being provided by sulphurization of the brass during the vulcanization or curing of the rubber. In order to improve the adhesion, use is generally made, in addition, in these rubber compositions, of organic metal salts or metal complexes, such as cobalt salts, as adhesion-promoting additives.

However, it is known that the adhesion between the carbon steel and the rubber matrix is capable of weakening over time as a result of the gradual development of sulphides formed under the effect of the various stresses encountered, in particular mechanical and/or thermal stresses, it being possible for the above degradation process to be accelerated in the presence of moisture.

Moreover, the use of cobalt salts renders the rubber compositions more sensitive to oxidation and to aging, and significantly increases the cost thereof, not to mention that it is desirable to eliminate, in the long run, the use of such cobalt salts in rubber compositions due to recent developments in European regulations relating to metal salts of this type.

For all the reasons set out above, manufacturers of metal/rubber composites, in particular tyre manufacturers, are on the lookout for novel adhesive solutions in order to adhesively bond metal reinforcers to rubber compositions, while overcoming, at least in part, the abovementioned disadvantages.

3. BRIEF DESCRIPTION OF THE INVENTION

In point of fact, during their research studies, the Applicant Companies have found a novel polymer of the type containing urethane or thiourethane units, having a specific formula, which meets such an objective.

Consequently, the invention relates to a polymer having urethane or thiourethane units, which can be used in particular as adhesion primer for the adhesive bonding of metal or glass to an unsaturated rubber, comprising at least, on the one hand, base units comprising at least a sub-unit of formula —$X_1$—CO—NH— in which $X_1$ respectively represents O or S, and, on the other hand, additional units comprising at least, on the one hand, a secondary alcohol function, and, on the other hand, a thioether function in the α position relative to this alcohol function.

It has been observed, unexpectedly, that the presence of these specific additional units gives high adhesive properties to textile or metallic materials in relation to an unsaturated elastomer composition or matrix such as those commonly used in tyres.

The metal reinforcers thus coated with the polymer according to the invention, as adhesion primer, exhibit the major advantage of being able to be subsequently adhesively bonded to unsaturated rubber matrices using simple textile adhesives, such as "RFL" (resorcinol-formaldehyde-latex) adhesives or other equivalent adhesive compositions, or also directly (that is to say, without employing such adhesives) to these unsaturated rubber matrices when the latter comprise, for example, appropriate functionalized unsaturated elastomers, such as epoxidized elastomers.

By virtue of the invention, use may be made of metal reinforcers coated or not coated with adhesive metal layers such as brass, and also surrounding rubber matrices devoid of metal salts, in particular of cobalt salts.

The invention also relates to the use of the polymer according to the invention as adhesion primer for the adhesive bonding of any substrate, in particular of metal, such as iron or brass, or also of glass, to an unsaturated rubber, such as, in particular, a diene elastomer.

This polymer of the invention is highly flexible and has a large elongation at break. It has furthermore displayed hydrophobic properties; the coating provided exhibits effective properties of corrosion resistance. Thus, the invention also relates to the use of this polymer as corrosion-resistant protective coating for a substrate made of metal or for a substrate having a surface which is at least partially metallic, in particular in any application where the said metal substrate is liable to be used in a wet environment.

Finally, the invention also relates per se to any substrate, in particular of metal or of glass (or at the very least having a surface comprising metal or glass), which is coated, at least in part, with a polymer according to the invention.

The invention relates in particular to any metal reinforcer coated with a polymer according to the invention. It relates more particularly to any metal wire, cord, film or plate, at least a portion of the surface of which is made of brass-coated steel, characterized in that the said brass-coated steel is itself coated with a polymer in accordance with the invention.

The invention and its advantages will be easily understood in the light of the detailed description and implementational examples which follow, and also of the FIGS. 1-10 relating to these examples, which represent or represent diagrammatically:

examples of base units, comprising sub-units of general formula (I), respectively of specific formulae (I-1) to (I-5) (FIG. 1);

examples of additional units, comprising sub-units of general formula (II), respectively of specific formulae (II-1) to (II-3) (FIG. 2);

examples of sequences (repeating structural units) of polyurethane polymers in accordance with the invention, of formulae (III-1) to (III-3), these sequences comprising both base units of specific formula (I-1) and additional units of specific formulae (II-1) to (II-3) comprising thioether bonds according to the invention (FIG. 3);

a possible synthesis scheme for a diol monomer (Monomer A1) from two compounds (Compound 1 and Compound 2) (FIG. 4.1), and then for a polymer (Polymer P1) in accordance with the invention from Monomer A1 and a diisocyanate monomer MDI (Monomer A2) (FIG. 4.2);

a $^1$H NMR spectrum (500 MHz), of Monomer A1 and its starting Compound 1, respectively, both dissolved in CDCl$_3$ (FIG. 5.1 and FIG. 5.2);

another possible synthesis scheme, starting from Monomer A1 and another diisocyanate monomer (denoted Monomer A3; benzophenone-blocked MDI) for the same Polymer P1 (FIG. 6);

a possible synthesis scheme for another polyol monomer (Monomer A4) (FIG. 7.1) and also for another polymer (Polymer P2) in accordance with the invention, starting from Monomer A4 and Monomer A3 (FIG. 7.2);

a possible synthesis scheme, starting from Monomer A1, Monomer A3 and a polyol monomer (denoted Monomer A5), for another polymer (Polymer P3) in accordance with the invention (FIG. 8);

a possible synthesis scheme, in two successive steps, firstly for a monomer or prepolymer (Monomer A8) starting from two other monomers (Monomer A6 and Monomer A7), and then starting from Monomer A8 and Monomer A3, for another polymer (Polymer P4) in accordance with the invention (FIG. 9).

4. DETAILED DESCRIPTION OF THE INVENTION

The polymer of the present invention therefore has the essential characteristics of comprising both:
- base units comprising at least one (that is to say one or more) sub-unit of formula —X$_1$—CO—NH— in which X$_1$ represents O (reference is then made to urethane base units) or S (thiourethane base units), and, on the other hand,
- additional units comprising at least one (that is to say one or more) secondary alcohol function, and at least one (that is to say one or more) thioether function in the α (alpha) relative to the alcohol function (that is to say, as a reminder, borne by a carbon adjacent to the carbon bearing the secondary alcohol function).

In other words, an essential characteristic of the polymer of the invention is thus that its additional units comprise at least one α-hydroxy-thioether sub-unit.

These base units and additional units will be described in detail below.

Preferably, the base units of the polymer of the invention comprise at least a sub-unit of formula (I):

—X$_1$—C(O)—N(H)—Z$_1$—N(H)—C(O)—X$_2$—  (I)

in which:
X$_1$ represents O or S;
X$_2$ (therefore identical to or different from X$_1$) represents O, S or NH;
Z$_1$ represents an at least divalent bonding group which is aliphatic, cycloaliphatic or aromatic.

Preferably, the additional units of the polymer of the invention comprise at least a sub-unit of formula (II) selected from:

—CH(OH)—(CH$_2$)—S—  (II-1)

—CH(OH)—(CHR$_1$)—S—  (II-2)

—CH(OH)—(C=R$_2$)—S—  (II-3)

in which R$_1$ and R$_2$ represent an aliphatic, cycloaliphatic or aromatic hydrocarbon group.

These general formulae (I), on the one hand, and (II-1), (II-2) and (II-3), on the other hand, have been represented below in structural form:

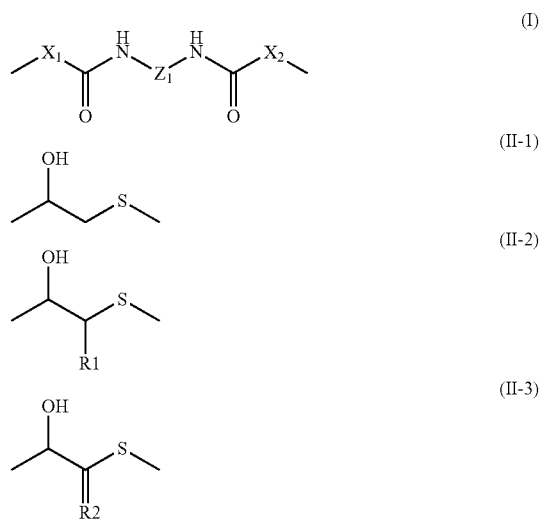

It is noted that, in the three formulae (II-1), (II-2) and (II-3) above, there is indeed a thioether function in the α position relative to the secondary alcohol function.

Of course, these representations are equivalent to the three representations in which the thioether function is in the α' position (that is to say, on the other side) relative to the secondary alcohol function.

According to a different possible alternative embodiment of the invention, illustrated by way of examples by the three formulae below denoted (II-1'), (II-2') and (II-3'), there are 2 secondary alcohol functions (and not just one) which are located on either side of the thioether function:

—CH(OH)—CH$_2$—S—CH$_2$—CH(OH)—  (II-1)

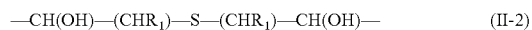—CH(OH)—(CHR$_1$)—S—(CHR$_1$)—CH(OH)—  (II-2)

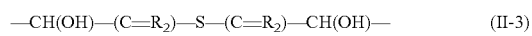—CH(OH)—(C=R$_2$)—S—(C=R$_2$)—CH(OH)—  (II-3)

The above sub-units can be classified as α,α'-dihydroxy-thioether sub-units.

The five possible specific formulae (I-1 to 1-5) which correspond to the general formula (I) have been represented in structural form in the appended FIG. 1, in which general formula (I) X$_1$ represents O or S, and X$_2$ represents O, S or NH.

In a manner well known to those skilled in the art, specific formula (I-1) describes a structural base unit of a polymer of poly(urethane) type, formula (I-2) describes a structural base unit of a polymer of poly(thiourethane) type, formula (I-3) describes a structural base unit of a polymer of poly(thiourethane)(urethane) type, formula (I-4) describes a structural unit of a polymer of poly(thiourethane)(urea) type, and formula (I-5) describes a structural base unit of a polymer of poly(urethane)(urea) type.

$R_1$ and $R_2$ represent an aliphatic, cycloaliphatic or aromatic hydrocarbon group, which may contain a heteroatom such as S, O or N, preferably comprising 1 to 12 carbon atoms.

More preferably, $R_1$ is an aliphatic group and more preferably still an alkyl group. More preferably still, $R_1$ is an alkyl having from 1 to 5 carbon atoms, it being possible for this alkyl to be substituted or unsubstituted; more particularly, $R_1$ represents a methyl or an ethyl and more particularly still a methyl.

More preferably, $R_2$ is an aliphatic group and more preferably still an alkylidene group. More preferably still, $R_2$ is an alkylidene having from 1 to 5 carbon atoms, it being possible for this alkylidene to be substituted or unsubstituted; more particularly, $R_2$ represents a methylidene.

$Z_1$ represents an aliphatic, cycloaliphatic or aromatic divalent bonding group, the aliphatic group preferably comprising from 1 to 30 (more preferably from 1 to 20) carbon atoms, the cycloaliphatic group preferably comprising from 3 to 30 (more preferably from 3 to 20) carbon atoms and the aromatic group comprising from 6 to 30 (more preferably from 6 to 20) carbon atoms.

The polymer of the invention is preferably a linear-type polymer, therefore derived from a diisocyanate monomer. The diisocyanate used can be aromatic, aliphatic or cycloaliphatic; it can be a monomer, a prepolymer or a quasi-prepolymer, indeed even a polymer.

According to a preferred embodiment, the diisocyanate from which the polymer of the invention results is selected from the group consisting of the following aromatic compounds: diphenylmethane diisocyanate (abbreviated to "MDI"), toluene diisocyanate ("TDI"), naphthalene diisocyanate ("NDI"), 3,3'-bitoluene diisocyanate ("TODI"), para-phenylene diisocyanate ("PPDI"), their various isomers and the mixtures of these compounds and/or isomers.

More preferably, use is made of an MDI or a TDI, more preferably still of an MDI.

All the isomers of MDI (in particular 2,2'-MDI, 2,4'-MDI and 4,4'-MDI) and their mixtures can be used, as well as what are referred to as polymeric MDIs (or "PMDIs") comprising oligomers of following formula (with p equal to or greater than 1):

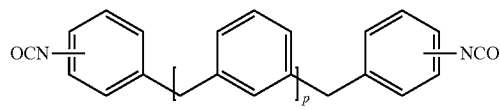

Diisocyanate compounds of the aliphatic type can also be used, such as, for example, 1,4-tetramethylene diisocyanate, 1,6-hexane diisocyanate ("HDI"), 1,4-bis(isocyanatomethyl)cyclohexane, 1,3-bis(isocyanatomethyl)cyclohexane, 1,3-bis(isocyanatomethyl)benzene, 1,4-bis(isocyanatomethyl)benzene, isophorone diisocyanate ("IPDI"), bis(4-isocyanatocyclohexyl)methane diisocyanate ("H12MDI") or 4,4'-dicyclohexylmethane diisocyanate ("H13MDI").

According to a particularly preferred embodiment, the diisocyanate used is 4,4'-MDI (4,4'-diphenylmethane diisocyanate), having the formula:

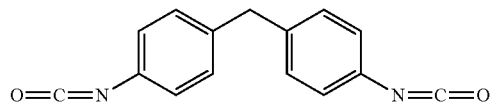

or, if several diisocyanates are used, constitutes the predominant diisocyanate by weight, preferably representing, in the latter case, more than 50% of the total weight of the diisocyanate compounds.

Use may also advantageously be made of a caprolactam-blocked 4,4'-MDI (for example the product in the solid form "Grilbond IL-6" from EMS), of formula:

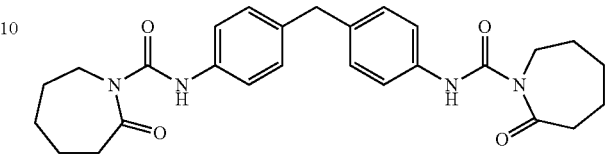

As the invention is not, however, limited to a linear-type polymer (as a reminder, derived from a diisocyanate), it will also be possible to use, in particular with the aim of increasing the Tg of the polymer of the invention by formation of a three-dimensional network, a triisocyanate compound, such as, for example, an MDI trimer having a triazine ring of the formula below:

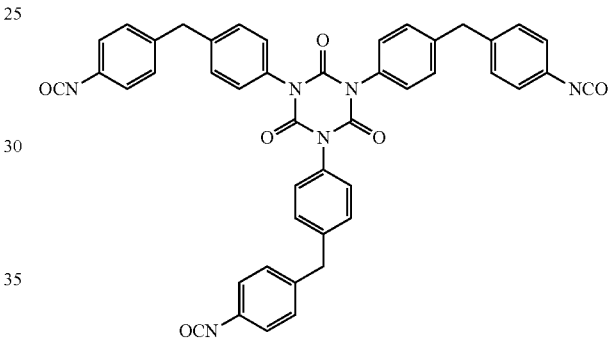

According to another particularly preferred embodiment, $X_1$ and $X_2$ both represent an oxygen (O) atom, that is to say the polymer of the invention is a polymer of poly(urethane) type.

According to another particularly preferred embodiment, $X_1$ and $X_2$ both represent a sulphur (S) atom, that is to say the polymer of the invention is a polymer of poly(thiourethane) type.

According to an essential embodiment of the invention, the polymer (in particular polyurethane or polythiourethane) of the invention therefore comprises, as well as these base units of formula (I), at least one secondary alcohol function in the α (alpha) position relative to the thioether function.

Thus, according to a more particularly preferred embodiment, the polymer of the invention is for example a polyurethane comprising at least linkages of base units of formula (I-1) and additional units of formula (II-1), (II-2) or (II-3).

Such a preferred polyurethane according to the invention more preferably comprises at least one sequence (repeating structural unit) which comprises at least one sub-unit corresponding to one of formulae (III-1) to (III-3) below:

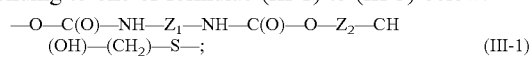　(III-1)

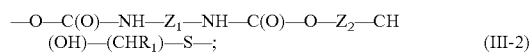　(III-2)

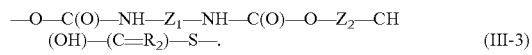　(III-3)

Formulae (III-1) to (III-3) above, in which $Z_2$ is therefore intended to link the base units of formula (I) and the sub-unit of formula (II), have also been represented in structural form in the appended FIG. 3.

In these three formulae, $Z_1$, $R_1$ and $R_2$ have the definitions given previously and $Z_2$, which may in particular be identical to or different from $Z_1$, itself represents an at least divalent bonding group which is aliphatic, cycloaliphatic or aromatic, the aliphatic group preferably comprising from 1 to 30 (more preferably from 1 to 20) carbon atoms, the cycloaliphatic group preferably comprising from 3 to 30 (more preferably from 3 to 20) carbon atoms and the aromatic group comprising from 6 to 30 (more preferably from 6 to 20) carbon atoms. $Z_1$ and $Z_2$, which may be identical or different, may be saturated or unsaturated, substituted or unsubstituted.

More preferably still, $Z_2$ is a alkylene comprising from 1 to 12 carbon atoms, in particular 1 to 4 carbon atoms (methylene, ethylene, butylene or propylene), more particularly still a methylene group ($CH_2$).

The appended FIGS. 4 and 6 to 9 represent preferred examples of polymers in accordance with the invention, or monomers which can be used for the synthesis of these polymers, and also various possible schemes for the synthesis of these monomers and/or polymers.

FIGS. 4.1 and 4.2 illustrate in particular possible synthesis methods respectively for a polyol monomer (Monomer A1) with 2 primary alcohol functions (primary diol), and then for a polymer (Polymer P1) in accordance with the invention, of polyurethane type, from this Monomer A1 and a diisocyanate monomer MDI (Monomer A2), which methods will be described in detail subsequently.

This example of a polymer in accordance with the invention indeed comprises a repeating sub-unit of formula (III-1):

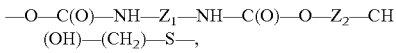

as defined previously, in which $Z_1$ and $Z_1$ have the general definitions given for the sub-units of formulae (I), (II) and (III), $Z_1$ corresponding more particularly to the divalent MDI residue group, and $Z_2$ corresponding to the methylene ($CH_2$).

It can be clearly seen in this FIG. 4.2 that, in accordance with the invention, Polymer P1 contains, in addition to its urethane base units, additional units which comprise a (single) thioether function (—S—) in the α position relative to a secondary alcohol function (—CH(OH)—).

FIG. 6 illustrates another possible method for the synthesis of this same Polymer P1 according to the invention, this time starting from Monomer A1 and another diisocyanate monomer (Monomer A3; caprolactam-blocked MDI), which method will be described in detail subsequently.

FIGS. 7.1 and 7.2 illustrate methods for the possible synthesis respectively of another polyol monomer (primary diol) (Monomer A4) and then of another polymer (Polymer P2) in accordance with the invention, of polyurethane type, starting from the Monomer A3 and the Monomer A4, which methods will be described in detail subsequently.

This other example of a polymer in accordance with the invention indeed comprises a repeating sub-unit of formula (III-1):

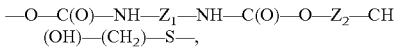

as defined previously, in which $Z_1$ and $Z_1$ have the general definitions given for the sub-units of formulae (I), (II) and (III), $Z_1$ corresponding more particularly to the divalent MDI residue group, and $Z_2$ corresponding to the methylene ($CH_2$).

It can be clearly seen in FIG. 7.2 that, in accordance with the invention, Polymer P2 contains, in addition to its urethane base units, additional units which this time comprise not a single, but rather three, thioether functions (—S—), two of which are in the α position relative to a secondary alcohol function.

These two other examples of a polymer in accordance with the invention indeed comprise both base units comprising at least one repeating sub-unit of formula (I):

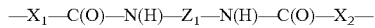

and additional units comprising at least one sub-unit of formula (II-1):

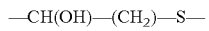

as defined previously, in which $X_1$, $X_2$ and $Z_1$ have the general definitions given for the sub-units of formulae (I) and (II); $Z_1$ corresponding more particularly to the divalent MDI residue group.

Figure 8:
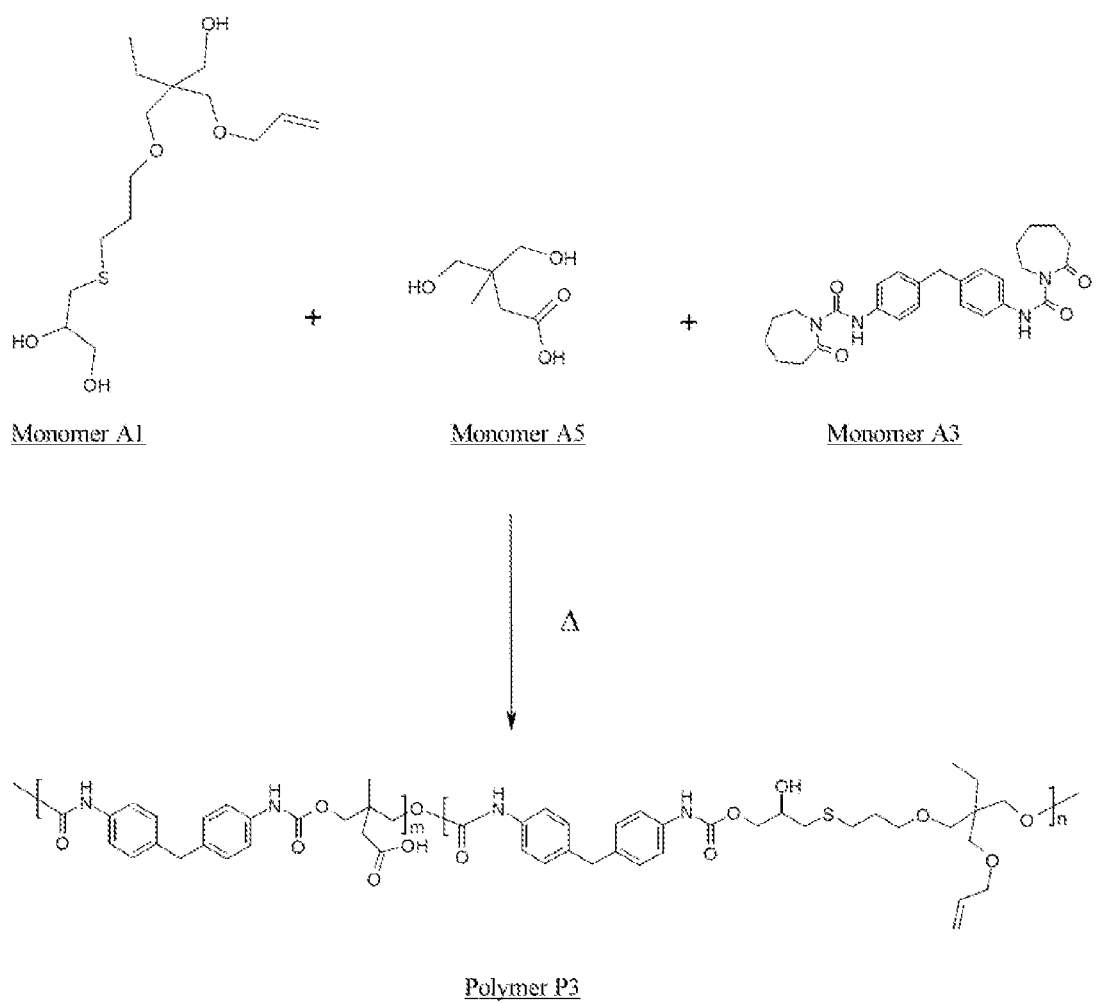
FIG. 8 illustrates another method for the synthesis of another polymer (Polymer P3) in accordance with the invention, starting from Monomer A1, Monomer A3 and another polyol monomer (Monomer A5), which method will be described in detail subsequently.
Figure 9:
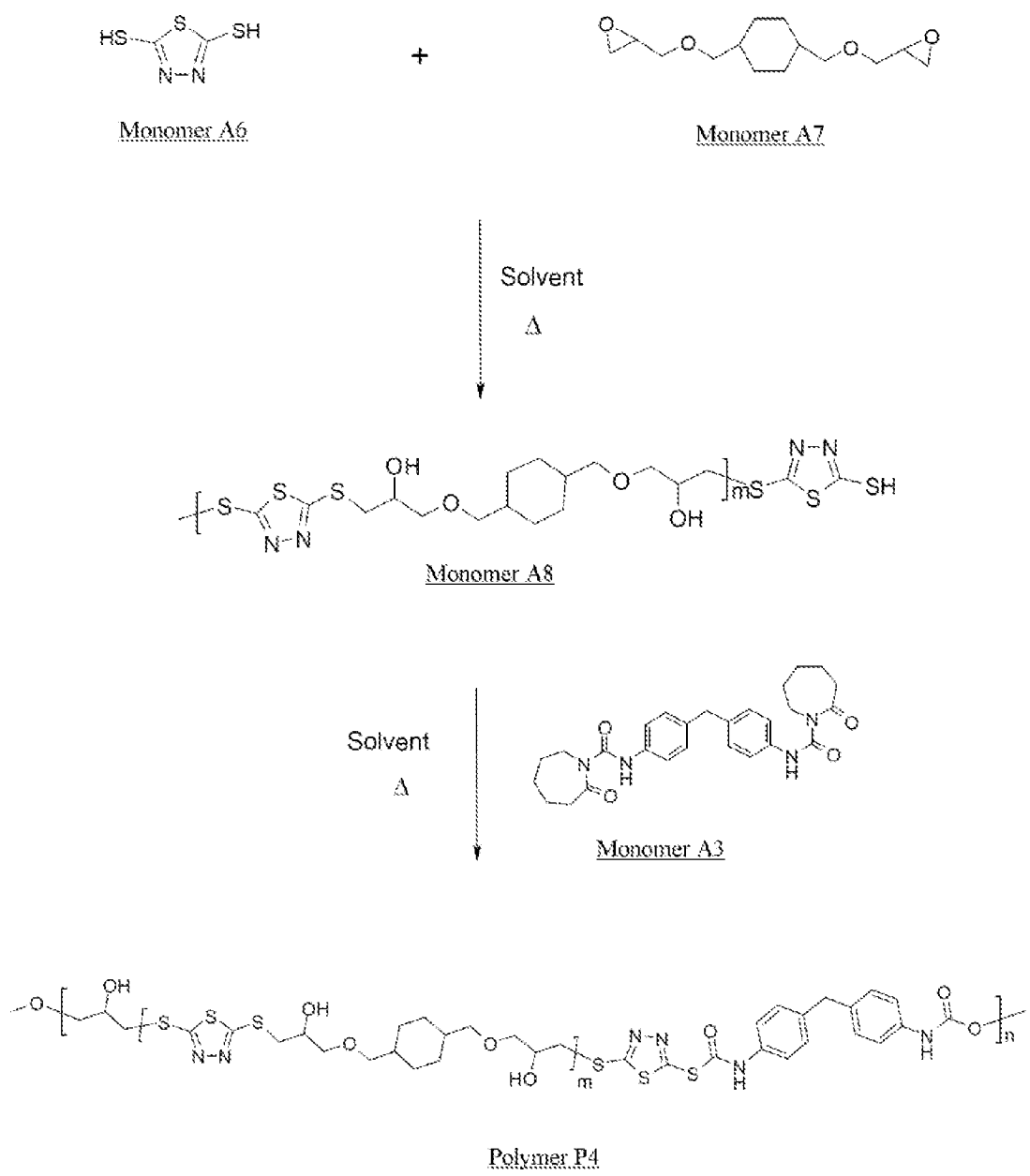
FIG. 9 illustrates another method for the synthesis, this time in two successive steps, of another polymer (Polymer P4) in accordance with the invention, firstly starting from two other monomers (Monomers A6 and A7) to form a prepolymer (or Monomer A8), then by reacting the prepolymer with the Monomer A3, which method will be described in detail subsequently.

It can be clearly seen in FIGS. 8 and 9 that, in accordance with the invention, Polymers P3 and P4 contain, in addition to their base units, additional units comprising at least one thioether function (—S—) in the α position relative to a secondary alcohol function (—CH(OH)—).

Figure 6:
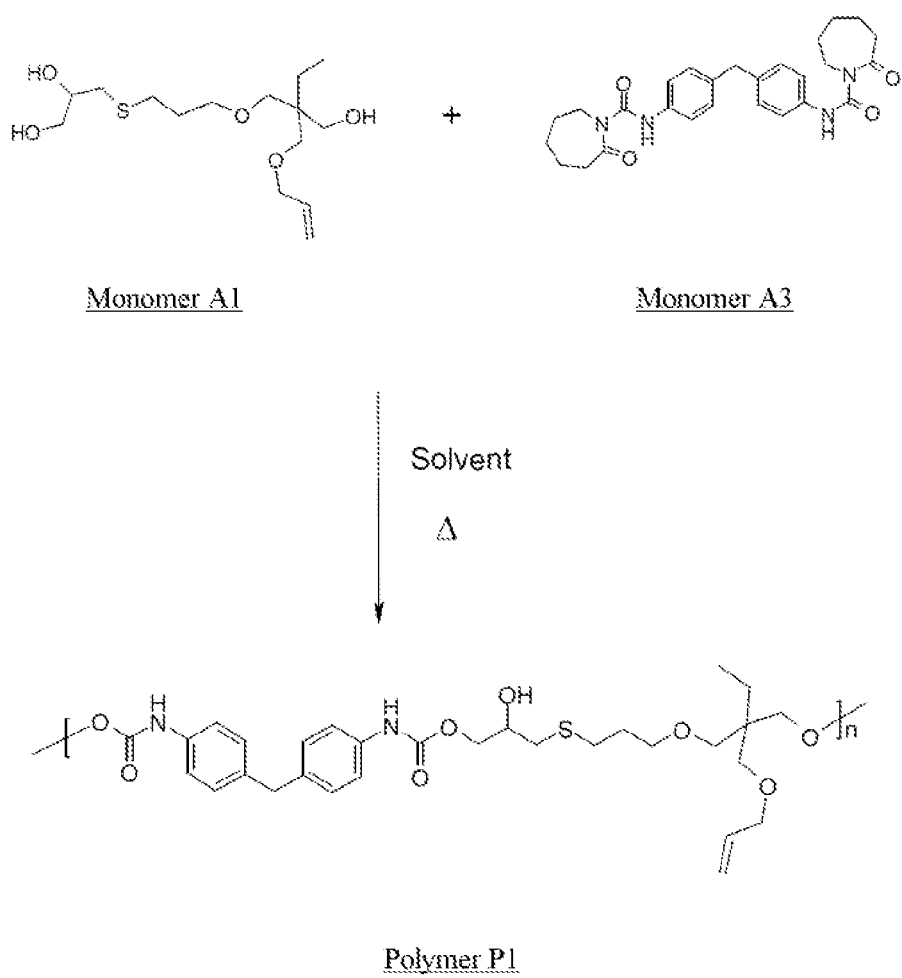

Typically, the polymer of the invention may comprise from ten to several hundred, preferably from 20 to 200, structural units with sub-units of formula (I) and sub-units of formula (II), in particular structural units with sub-units of formula (III), as represented in particular by way of examples in the appended figures (FIG. 4.2 and FIG. 6 for Polymer P1, FIG. 7.2 for Polymer P2, FIG. 8 for Polymer P3 and FIG. 9 for Polymer P4). Its glass transition temperature Tg, measured by DSC (Differential Scanning calorimetry), for example according to standard ASTM D3418, is preferably greater than 50° C., more preferably greater than 100° C., in particular between 130° C. and 250° C.

As indicated above, this polymer of the invention can advantageously be used as hydrophobic coating on any type of substrate, in particular made of metal or glass, or also as adhesion primer on any type of metal reinforcer, such as, for example, a wire, a film, a plate or a cord made of carbon steel, coated or not coated with brass, intended in particular to reinforce a matrix of unsaturated rubber, such as natural rubber.

5. EXAMPLES OF THE IMPLEMENTATION OF THE INVENTION

In the present patent application, unless expressly indicated otherwise, all the percentages (%) shown are percentages by weight.

5.1. Test 1—Synthesis of Monomer A1

Monomer A1 is 3-[3-(2-allyloxymethyl-2-hydroxymethylbutoxy)propylsulphanyl]propane-1,2-diol. This monomer was synthesized according to the procedure represented diagrammatically in FIG. 4.1, as described in detail hereinafter: 4.76 g of Compound 1 (90% pure trimethylolpropane diallyl ether, from Sigma Aldrich), then 2.16 g of Compound 2 (thioglycerol) are placed in a 50 ml glass round-bottomed flask provided with a magnetic stirrer bar, the assembly being covered with a glass stopper to avoid any losses by evaporation; the reaction mixture is stirred at ambient temperature (20° C.) for 4 hours, then overnight (around 12 hours) at a temperature of 80° C.

A transparent, viscous liquid is obtained in this way, the NMR spectrum of which (reproduced in FIG. 5.1), compared to the NMR spectrum of starting Compound 1 (reproduced in FIG. 5.2), taking as reference the transition of the methyl group at 0.86 ppm (3 protons) and following the reduction in the integrals corresponding to the protons of the vinyloxy group, indeed confirms to those skilled in the art that it is Monomer A1, of formula:

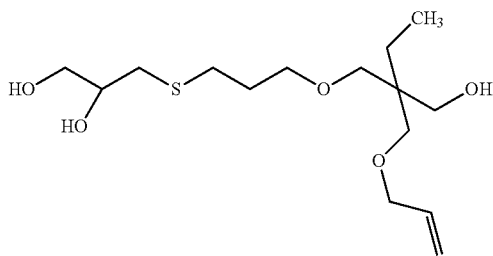 [SMILES: C=CCOCC(CC)(CO)COCCCSCC(O)CO]

The $^1$H NMR analysis (500 MHz, CDCl$_3$) (FIG. 5.1) of the product gave the following results: 0.85 (m, 3H), 1.39 (m, 2H), 11.86 (m, 1H), 2.65 (m, 3H), 3.46 (m, 8H), 3.73-3.75 (s, 2H), 3.98 (d, 2H), 5.16-5.19 (d, 1H), 5.28 (d, 1H), 5.88 (m, 1H).

Finally, the molecular weight of the product, as measured by "ESI" (Electrospray Ionization) mass spectrometry in a 1/1 mixture of water/acetonitrile (with trace NaCl) was evaluated in negative mode ([M+Cl]$^-$ anion) at 357.3 (calculated theoretical value equal to 357.5) and in positive mode ([M+Na]$^+$ cation) at 345.2 (calculated theoretical value equal to 345.5).

5.2. Test 2—Synthesis of Polymer P1 by Reacting Monomers A1 and A2

This test gives a detailed description of the synthesis of Polymer P1 in accordance with the invention, starting from Monomers A1 and A2, according to the procedure represented diagrammatically in FIG. 4.2.

3.40 g of Monomer A1 then, as polymerization catalyst, 18.1 mg (0.3% by weight) of bismuth neodecanoate and 100 ml of γ-butyrolactone solvent are placed into a dry 50 ml round-bottomed flask, all under an inert atmosphere (nitrogen stream). A solution (itself under an inert atmosphere) of 2.64 g of Monomer A2 (solid MDI dissolved in 20 ml γ-butyrolactone) is then added into the 50 ml round-bottomed flask by means of a dropping funnel. The transparent reaction mixture is stirred and heated at 80° C. for 4 hours.

3 ml of the solution of Polymer P1 obtained in this way are then deposited on a glass sheet (10×10 cm); the glass sheet is placed under vacuum at 80° C. for 1 hour until the solvent (γ-butyrolactone) has evaporated. The transparent film of Polymer P1 obtained in this way was analyzed by "ATR-FTIR" (*Attenuated Total Reflection InfraRed*) spectroscopy: synthesis of a polyurethane is indeed confirmed by the appearance of the peak visible at 1700 cm$^{-1}$, which is characteristic of the —OCONH— bond.

Incidentally, it was noted that Polymer P1 obtained in this way exhibited excellent adhesion to the glass (impossibility of separating by pulling the polymer from the glass).

In order to measure its molecular weight, the polymer dissolved in a mixture (1:20) of γ-butyrolactone and THF (tetrahydrofuran) was then subjected to GPC (Gel Permeation Chromatography) analysis (C18 reversed phase column and THF as mobile phase): a molecular weight (Mw) of approximately 140 000 was thus determined (polystyrene controls with molecular weight between 500 and 500 000). The same synthesis without polymerization catalyst led to a very broad elution profile with the predominant distribution centred at around 17 000.

Finally, the same synthesis carried out with 1% by weight of catalyst and in DTP solvent (1,3-dimethyl-3,4,5,6-tetrahydro-2(1H)-pyrimidinone)—CAS 7226-23-5) led to a Tg value equal to approximately 93° C. (DSC from –80° C. to 200° C. (10° C./min), 2$^{nd}$ pass).

5.3. Test 3—Synthesis of Polymer P1 by Reacting Monomers A1 and A3

Polymer P1 in accordance with the invention was also synthesized from monomers A1 and A3 (caprolactam-blocked MDI) according to the simple procedure represented diagrammatically in FIG. 6.

226.4 mg of Monomer A1 and 334.6 mg of Monomer A3 ("Grilbond" IL-6) are placed in a glass container, then 8 ml of γ-butyrolactone solvent are added and the mixture is heated under a stream of hot air (120° C.) until a clear solution is obtained.

3 ml of this solution are then deposited uniformly on a glass sheet (10×10 cm) and everything is then placed in an oven at 190° C. for 15 min under vacuum so as to eliminate any traces of solvent. The transparent film of Polymer P1 obtained in this way was characterized as previously (ATR-FTIR) and gave virtually the same infrared spectrum. DSC analysis (second pass) from –80° C. to 200° C. (10° C./min) gave a Tg equal to approximately 120° C.

5.4. Test 4—Test of Adhesion of Polymer 1 in a Metal/Rubber Composite

In this test, a new sample of Polymer P1 in accordance with the invention was synthesized as indicated in the previous test, simply by replacing the γ-butyrolactone solvent by DTP.

A thin film of Polymer P1 obtained in this way was deposited (at ambient temperature) uniformly on the surface of a brass sheet. Everything was then covered with a layer of conventional textile adhesive of the "RFL" (resorcinol-formaldehyde-latex) type. After a 5 min pre-drying operation at 100° C., everything was then treated for 10 min in the oven at 190° C.

The brass sheet thus coated with the film of Polymer P1 and coated with RFL adhesive was subsequently placed in a matrix of conventional rubber composition (in the raw, non-vulcanized state) for a belt reinforcement of a passenger vehicle tyre, based on natural rubber, on carbon black and silica as filler and on a vulcanization system (sulphur and sulphenamide accelerator), this composition being devoid of cobalt salt.

The metal/rubber composite test specimen thus prepared was then placed under a press and everything was cured (vulcanized) at 165° C. for 30 min under a pressure of 20 bar. After vulcanization of the rubber, excellent adhesive bonding between the rubber matrix and the metal sheet was obtained, despite the absence of cobalt salt in the rubber matrix; this is because, during peel tests carried out both at ambient temperature (23° C.) and at high temperature (100° C.), it was found that the failure occurred systematically in the rubber matrix itself and not at the interphase between metal and rubber.

5.5. Test 5—Synthesis of Monomer A4

Monomer A4 is 3-{4-[4-(2,3-dihydroxypropylsulphanyl)phenylsulphanyl]-phenylsulphanyl}propane-1,2-diol. This monomer was synthesized according to the procedure represented diagrammatically in FIG. 7.1, as described in detail below.

8.3 g of solid 4,4'-thiobisbenzenethiol (i.e. 33.03 mmol) then 10.0 g of potassium carbonate (i.e. 72.56 mmol, dried beforehand under vacuum at 150° C. for 12 h) are introduced under an inert atmosphere (nitrogen stream) into a 500 ml four-necked flask, dried beforehand under vacuum at more than 100° C. and fitted with a condenser, thermometer and magnetic stirrer bar. 200 ml of anhydrous DMSO are then added, the dispersion is purged under nitrogen for 30 mins, then 7.29 g of liquid 3-chloro-1,2-propanediol (i.e. 66.05 mmol) are added dropwise. The reaction medium is immediately heated at 100° C. for 5 h, still under a stream of nitrogen. The solution obtained is then left to cool to ambient temperature, and the solid potassium carbonate ($K_2CO_3$) is recovered by filtration over filter paper. The filtrate is then washed with 50 ml of DMSO, then everything is added to 250 ml of deionized water at 0° C. (ice) to precipitate out the targeted product.

To neutralize the residual $K_2CO_3$, 10 ml of HCl (at 10%) and 1 liter of deionized water are then added. After drying under vacuum at 60° C. overnight (12 h), the precipitate obtained (tacky, orange-coloured solid) is added to 500 ml of ethyl acetate and everything is heated to 40° C. until complete dissolution is obtained. The solution obtained is cooled to ambient temperature (20° C.) then decanted into a separating funnel; 50 ml of saturated (aqueous) $NH_4Cl$ are then added. After stirring, the organic phase is separated off then washed twice with 25 ml of deionized water, then dried with dry sodium carbonate. After filtering and distillation of the ethyl acetate on a rotary evaporator ("rotavap"), the solid obtained is dried at 80° C.

NMR and ESI analyses indeed confirm the structure of Monomer A4 of formula:

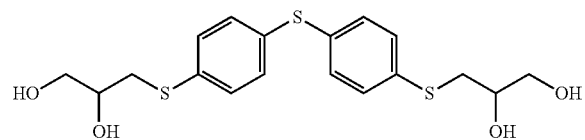 [SMILES: OCC(O)CSc1ccc(Sc2ccc(SCC(O)CO)cc2)cc1]

The $^1H$ NMR analysis (500 MHz, DMSO-$d_6$) of the product gave the following results: 2.89 (m, 2H), 3.11 (m, 2H), 3.40 (m, 4H), 3.61 (m, 2H), 4.67 (d, 2H), 4.99 (d, 2H), 7.22-7.24 (d, 4H), 7.31-7.33 (d, 4H).

The molecular weight, as measured by ESI mass spectrometry in a (1/1) mixture of ethyl acetate/methanol (with trace aqueous NaCl), was evaluated in negative mode ([M+Cl]$^-$ anion) at 433.3 (calculated theoretical value equal to 434.0) and in positive mode ([M+Na]$^+$ cation) at 421.1 (calculated theoretical value equal to 420.6).

5.6. Test 6—Synthesis of Polymer P2 by Reacting Monomers A3 and A4

This test gives a detailed description of the synthesis of Polymer P2 in accordance with the invention, starting from Monomers A3 and A4, according to the procedure represented diagrammatically in FIG. 7.2.

280.0 mg of Monomer A4, 334.6 mg of Monomer A3 and 8 ml of NMP solvent are placed in a glass flask. The suspension is heated (under a stream of hot air) to 120° C., until a clear solution is obtained.

3 ml of the solution obtained in this way are then placed on a polished (10×10 cm) brass sheet which is then placed in an oven for 15 mins at 190° C. A transparent film of Polymer P2 is obtained in this way, the DSC analysis (second pass, from −80° C. to 200° C.; 10° C./min) of which revealed a Tg of approximately 115° C. It may be noted that a similar polymerization reaction, but carried out in a solvent mixture of 1-methoxy-2-propanol acetate/sulfolane (3:1), led to a Tg of approximately 130° C.

An adhesion test of Polymer 2 in a metal (brass sheet)/rubber composite, as described in the preceding test 4, also gave an excellent result, with systematic failure within the rubber matrix itself and not at the interphase between metal and rubber.

5.7. Test 7—Synthesis of Polymer P3 by Reacting Monomers A1, A3 and A5

This test gives a description of the synthesis of Polymer P4 in accordance with the invention, starting from Monomers A1, A3 and A5, according to the procedure represented diagrammatically in FIG. 8.

1.34 g of Monomer A1, 0.61 g of Monomer A5 (BHBA, 2,2-bis(hydroxymethyl)propionic acid) then 7.90 g of Monomer A3 (caprolactam-blocked MDI, "Grilbond" IL-6 50%-F) are added successively into a glass flask. The suspension is stirred by mechanical vibration (vortex device) while gently increasing the temperature to approximately 50° C. (stream of hot air).

2.3 g of the suspension obtained are then distributed homogeneously on a (10×10 cm) glass sheet which is then treated in an oven for 10 mins at 190° C. until a yellow-coloured clear film is obtained; 10 additional minutes of treatment are carried out under vacuum so as to eliminate the gaseous components (i.e. total treatment time of 20 mins at 190° C.). A thin yellow film of Polymer P3 in accordance with the invention is obtained in this way, which adheres very well to the glass (impossibility of separating by pulling the polymer from the glass).

150 mg of the above suspension were also placed on a (3×3 cm) brass sheet then treated in an oven for 10 mins at 190° C., then 10 additional minutes under vacuum (i.e. total treatment time of 20 mins at 190° C.); excellent adhesion of the polymer of the invention to the metal could also be confirmed, with impossibility of separating by pulling the polymer from the brass sheet.

5.8. Test 8—Synthesis of Polymer P4

This test gives a detailed description of the two-stage synthesis of Polymer P4 in accordance with the invention; first of all from Monomers A6 and A7 to form a prepolymer (or Monomer A8), then secondly from Monomers A8 and A3, according to the procedure represented diagrammatically in FIG. 9.

180 mg (i.e. 0.70 mmol) of Monomer A7 (1,4-cyclohexanedimethanol diglycidyl) and 3 ml of THF solvent are introduced into a dry apparatus equipped with a condenser system and nitrogen stream; then 81.5 mg (i.e. 0.70 mmol) of Monomer A6 (1,3,5-thiadiazole-2,5-dithiol) are added with stirring and the solution is heated under reflux for 1 h. The solvent is completely removed by vacuum distillation and the transparent liquid obtained in this way (prepolymer or Monomer A8) is analyzed by DSC (−80° C. to 200° C., 10° C./min); it has a Tg peak at approximately −33° C., followed by an endotherm between 100 and 200° C. (peak at approximately 136° C.); at the second pass, this prepolymer had a Tg of approximately 10° C.

261.5 mg of Monomer A8 (previous prepolymer) and 336 mg of Monomer A3 (solid MDI, "Grilbond" device IL-6) are then added to a glass flask, and everything is mixed with 8 ml of DTP; the suspension is stirred by mechanical vibration (vortex device) while gently increasing the temperature (approximately 50° C.) until Monomer A3 has completely dissolved.

1.5 ml of this solution is then deposited homogeneously on a (10×10 cm) glass sheet which is then treated in an oven for 15 mins at 170° C. (air ventilation), then for an additional 15 mins at 170° C. under vacuum to eliminate any traces of solvent.

Polymer P4 (thin yellow-coloured film) in accordance with the invention obtained in this way demonstrated excellent adhesion to glass, brass and zinc. DSC analysis revealed a Tg of approximately 130° C. (second pass).

In conclusion, the above tests demonstrate that the polymer of the invention, characterized in particular by a high glass transition temperature and a high thermal and chemical stability, exhibits excellent adhesion to glass or metal.

Used in particular as adhesion primer on metal in metal/rubber composites, this polymer makes it possible very advantageously to adhesively bond the metal to the rubber matrices using simple textile adhesives, such as RFL adhesives or other equivalent adhesive compositions, or also directly (that is to say, without employing such adhesives) to these rubber matrices when the latter contain, for example, appropriate functionalized unsaturated elastomers, such as epoxidized elastomers.

Thus, cobalt salts (or other metal salts) can in particular be dispensed with in the rubber compositions intended to be attached to brass-coated metal reinforcers.

The invention claimed is:

1. An adhesion primer for the adhesive bonding of a substrate to an unsaturated rubber comprising a polymer having urethane units comprising from 20 to 200 repeating structural units corresponding to formula (III-1):

$$-O-C(O)-NH-Z_1-NH-C(O)-O-Z_2-CH(OH)-(CH_2)-S-, \quad (III-1)$$

wherein $Z_1$ represents an aromatic group comprising from 6 to 30 carbon atoms, and wherein $Z_2$ is an alkylene comprising 1 to 12 carbon atoms.

2. The adhesion primer according to claim 1, wherein the polymer is derived from a diisocyanate monomer selected from the group consisting of the compounds diphenylmethane diisocyanate (MDI), toluene diisocyanate (TDI), naphthalene diisocyanate (NDI), 3,3'-bitoluene diisocyanate (TODI), para-phenylene diisocyanate (PPDI), their isomers, and mixtures thereof.

3. The adhesion primer according to claim 2, wherein the polymer is derived from diphenylmethane diisocyanate (MDI).

4. The adhesion primer according to claim 1, wherein $Z_2$ is an alkylene comprising from 1 to 4 carbon atoms.

5. The adhesion primer according to claim 4, wherein $Z_2$ is a methylene.

6. A corrosion-resistant protective coating for a substrate having at least a surface which is at least partially metallic, said corrosion-resistant protective coating comprising the adhesion primer according to claim 1.

7. A substrate coated, at least in part, with the adhesion primer according to claim 1.

8. The substrate according to claim 7, wherein the substrate is made of glass or metal.

9. A metal reinforcer coated with the adhesion primer according to claim 1.

10. The metal reinforcer according to claim 9, wherein the metal reinforcer is selected from the group consisting of metal wire, cord, film and plate, and wherein at least a portion of the surface of the metal reinforcer is made of brass-coated steel coated with the adhesion primer.

* * * * *